United States Patent [19]

Beguin

[11] Patent Number: 4,933,262
[45] Date of Patent: Jun. 12, 1990

[54] METHOD OF MAKING INTEGRATED OPTICAL COMPONENT

[75] Inventor: Alain M. J. Beguin, Vulaines sur Seine, France

[73] Assignee: Corning Incorporated, Corning, N.Y.

[21] Appl. No.: 272,585

[22] Filed: Nov. 16, 1988

[30] Foreign Application Priority Data

Nov. 26, 1987 [FR] France ................................. 87 16398

[51] Int. Cl.$^5$ .............................................. G02B 7/26
[52] U.S. Cl. ........................................ 430/320; 430/4;
430/22; 430/321; 430/329; 430/394; 350/96.12; 350/96.3; 350/96.33; 350/96.11
[58] Field of Search ............... 430/320, 321, 323, 394, 430/22, 329, 4; 350/96.12, 96.3, 96.33, 96.11

[56] References Cited

U.S. PATENT DOCUMENTS 4,466,696  8/1984  Carney .
4,765,702  8/1988  Dohan et al. ..................... 350/96.12

FOREIGN PATENT DOCUMENTS 2085660  4/1982  United Kingdom .

OTHER PUBLICATIONS

L. P. Bovin, "Thin-Film Laser-to-Fiber Coupler", Applied Optics, Feb. 74, vol. 13, No. 2, pp. 391–395.
J. T. Boyd et al., "Optical Coupling from Fibers to . . . ", Applied Optics, Mar. 15, 1978, vol. 17, No. 6, pp. 895–898.

*Primary Examiner*—Paul R. Michl
*Assistant Examiner*—Thorl Chea
*Attorney, Agent, or Firm*—William J. Simmons, Jr.

[57] ABSTRACT

A method of making an integrated optical component in which a central planar region includes an optical circuit path and a lateral region includes an optical fiber positioning groove in alignment with the path. A glass body having central and lateral regions is coated with a mask material. A photolithographic technique is used to provide the mask material with a patterned opening in the central region corrsponding in shape to the circuit path and a patterned opening in the lateral region corresponding to the shape of the alignment groove. A layer of resisting material is applied over the mask on the central region and the lateral region is etched to form the groove. The layer of resisting material is removed, and the zone of the central region that is exposed by the opening in the mask is subjected to an ion exchange process in order to form therein an optical path that is in registration with the fiber positioning groove.

19 Claims, 2 Drawing Sheets

METHOD OF MAKING INTEGRATED OPTICAL COMPONENT

BACKGROUND OF THE INVENTION

1. Field of the Invention

The present invention relates to an integrated optical component and its manufacture. More specifically, it concerns a process for making an integrated optical component containing optical fiber positioning grooves in alignment with waveguides formed in the component.

One of the difficulties encountered in the industrial production of integrated optical components, such as connectors, couplers and the like is to obtain a precise positioning of the optical fibers in relation to the waveguides or optical circuit channels arranged in the component, the positioning of the fiber in front of the end of the optical circuit to be insured within a precision of one micrometer or even less.

2. The Prior Art

Integrated optical components have been produced using ion diffusion techniques. U.S. Pat. No. 4,765,702 depicts an integrated optical component having a monolithic glass body with at least one optical circuit path formed through ion exchange on its surface. The optical circuit path has the same constituents as the glass body plus ions which increase its refractive index to a value greater than that of the glass body. The glass body is provided with, on at least one of its sides where the optical circuit path exits, a sectioned cavity molded into the glass body. The optical circuit path ends at the sectioned cavity and is aligned with it in such a way that an optical device, for example, an optical fiber, is positioned in the cavity and thereby optically aligned with the optical circuit path. The sectioned cavity can be formed with a transverse section groove in the shape of a V. This integrated optical component can be manufactured by a process consisting of:

(a) molding with high precision a monolithic glass body having a sectioned cavity on at least one of its sides, and (b) forming in the piece obtained in (a), at least one optical circuit path by the ion exchange, i.e., ion diffusion, technique, with one end of this path being aligned with the sectioned cavity in such a way that an optical device positioned in the the cavity is optically aligned with the optical circuit path.

This integrated optical component can be, for example, a connector, a coupler-divider, a single-mode coupler, a single-mode multiplexer coupler, a multimode multiplexer coupler, a coupler allowing an optical fiber to be lined up with a collimating lens, or a multimode monitor.

However, in the component described in U.S. Pat. No. 4,765,702, the alignment precision of the sectioned cavities with the optical circuit paths is very delicate, especially for the manufacture of single-mode couplers which require a greater precision in positioning the fibers than the multimode couplers.

U.S. patent application Ser. No. 166,388 filed Mar. 10, 1988 teaches an integrated optical component comprising a glass substrate with at least one ion diffused optical circuit path connected to at least one optical fiber. The component further comprises at least one transverse exit groove forming a vertical lateral surface at a termination of the optical circuit path, an endface of the optical fiber abutting the termination at the vertical lateral surface; plateau support means adjacent the side of the transverse exit groove opposite the optical circuit path for supporting an uncoated portion of the optical fiber; second support means adjacent the side of the plateau support means opposite the optical circuit path for supporting a coated or sheathed portion of the optical fiber; and, first adhesive means for securing the optical fiber endface to the vertical lateral surface. This integrated optical component can be manufactured by a process consisting of: (a) forming a glass body substantially in the form of a rectangular glass block; (b) creating at least one optical circuit path in the glass body by ion exchange; (c) mechanically machining at least one transverse exit groove to create a termination for the optical circuit path; (d) mechanically machining a transverse support shoulder for supporting a coated or sheathed portion of the fiber; (e) forming plateau support means for supporting an uncoated portion of the fiber; (f) approximately aligning an endface of the fiber with the optical circuit path termination; (g) precisely aligning the fiber endface and the optical circuit path termination by means of a micromanipulator tool; and (h) securing the fiber endface to the optical circuit path termination with an adhesive means.

Because of the manner in which the glass block is formed in the method of U.S. patent application Ser. No. 166,388, the fiber endface must initially be approximately aligned and thereafter precisely aligned by means of a micromanipulator tool.

It is therefore an object of the present invention to provide a method of making an integrated optical component to which optical fibers can be easily and precisely aligned.

SUMMARY OF THE INVENTION

The present invention relates to a method for manufacturing an integrated optical component having at least one groove for positioning an optical fiber in alignment with an optical waveguide of the optical component. There is provided a glass body having at least one planar surface and at least one flat surface laterally disposed with respect to the planar surface. Masking material is deposited on the planar and flat surfaces. A pattern of openings having a design corresponding to the grooves and waveguides of the optical component are photolithographically formed in the layers of masking material by a process having a single exposure step. An optical waveguide path is formed through the opening overlying the planar surface. That portion of the flat surface that is exposed through the opening in the layer of masking is subjected to a chemical attack in order to form therein an optical fiber positioning groove that is in precise alignment with the optical path. Finally, the residual portions of the masking material are eliminated.

The flat surface of the glass body can be recessed with respect to the planar surface such that the surfaces are in different planes.

Various techniques can be employed to form the optical circuit path. The zones of the planar surface that are devoid of a masking layer can be subjected to an ion exchange process to form optical channels therein. The process can include the optional step of subjecting the planar surface to an ion exchange bath and applying an electric field across the glass body to cause the channels formed in the planar surface to become buried beneath that surface.

Alternatively, an optical waveguide path can be formed on those regions of the planar surface that are devoid of a masking layer. For example, a layer of glass of higher refractive index than the glass body can be deposited on those regions of the planar surface that are devoid of a masking layer a layer. The glass can be deposited by a suitable technique such as rf sputtering, evaporation chemical vapor deposition and flame hydrolysis.

The step of photolithographically forming a pattern of openings in the layers of masking material can comprise the following steps: (a) applying layers of photosensitive resisting material on the layers of masking, (b) exposing the photosensitive layers to an appropriate source of radiation through a single photomask having a design corresponding to the grooves and waveguides of the optical component, (c) developing the exposed photosensitive layers, (d) eliminating the appropriate parts of the resisting material, thereby forming openings in the resisting material corresponding in location to the waveguides and grooves to be formed, (e) eliminating the parts of the masking layer exposed through the openings, and (f) eliminating the residual resisting material.

DESCRIPTION OF THE EXEMPLARY EMBODIMENTS

Figure 1:
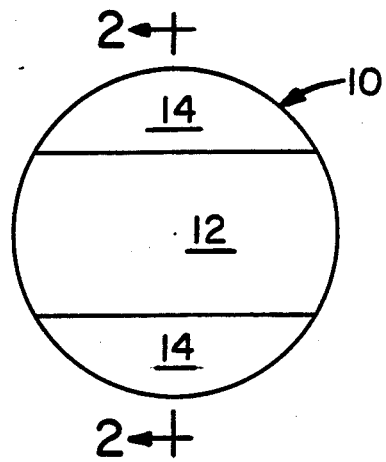
FIG. 1 is a top view of a glass body to be used in the method of the invention.
Figure 2:
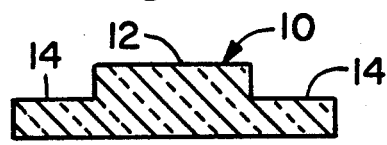
FIG. 2 is a cross-sectional view taken along lines 2—2 of FIG. 1.

FIGS. 1 and 2 show a monolithic glass body 10 having a central plane portion 12 and flat surfaces 14 which function in this embodiment as transverse optical fiber support shoulders. Although body 10 is depicted as being a circular disk, it could have other shapes including rectangular. Block 10 can initially have uniform thickness, and shoulders 14 can be formed by etching, grinding or the like. The steps set forth below are depicted in the schematic illustrations of FIGS. 3,4 and 6–12 wherein the relative widths of regions 12 and 14 are not shown. Furthermore, for reasons of clarity in representation, the level difference between the plane central region 12 and the shoulders 14, as well as the thickness of the deposited layers have been greatly exaggerated.

I(a) Layers 16 and 17 of masking material (FIG. 3) are deposited on the upper surfaces of central plane portion 12 and shoulders 14.

I(b) Layers 18 and 19 of photosensitive resist material (FIG. 4) are applied over the surfaces of layers 16 and 17.

Figure 5:
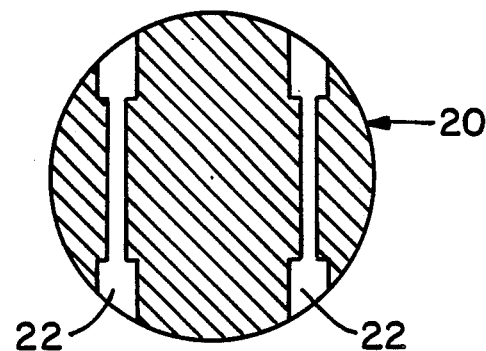
FIG. 5 shows a photomask for use in exposing the photostat coated article schematically illustrated in FIG. 4.

I(c) The photosensitive layers are exposed to an appropriate radiation source through a suitable photomask having a design corresponding to the grooves and waveguides to be achieved. The photomask can be a mainly transparent element or a mainly opaque element, depending on the type of photoresist to be used. For example, the photomask shown in FIG. 5, which is suitable for use with a positive photoresist, could comprise an opaque element 20 having two transparent paths 22.

Figure 6:
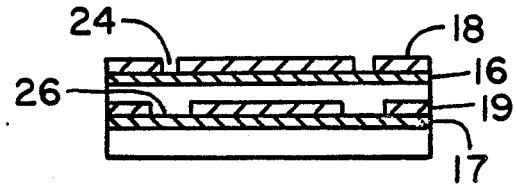

I(d) The exposed photosensitive layer is developed, and the exposed regions are removed to form openings 24 and 26 (FIG. 6). It is noted that openings 24 correspond to the the waveguides to be formed in the surface of region 12, and openings 26 correspond to the grooves to be formed in the surfaces of shoulders 14.

Figure 7:
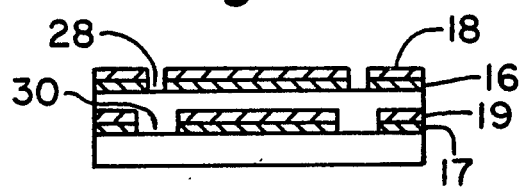

I(e) As shown in FIG. 7, the parts of the masking material exposed in step I(d) are eliminated to form openings 28 in masking layer 16 and openings 30 in masking layer 18.

Figure 8:
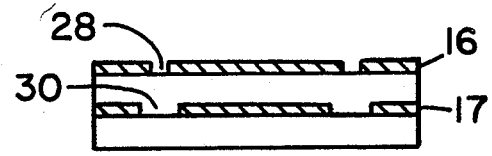

I(f) The residual photoresist material is eliminated, thereby leaving the mask shown in FIG. 8.

II(a) A layer 32 of resisting material (FIG. 9) is applied over the mask 16.

Figure 9:
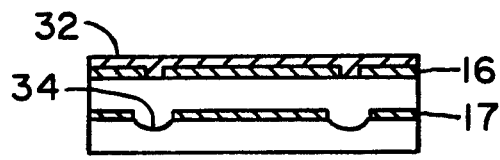

II(b) The upper sides of the shoulders 14 are subjected to a chemical attack through openings 30 in order to form the optical fiber positioning grooves 34 (FIG. 9).

II(c) Layer 32 of resisting material is removed.

Figure 10:
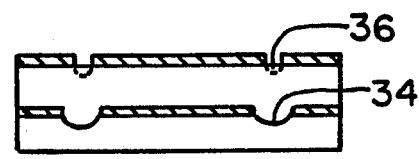

III(a) An optical waveguide path is formed along that portion of surface 12 that is exposed through openings 28 in mask 16. In the first illustrated embodiment, the exposed regions of central region 12 are subjected to an ion exchange process in order to form the optical channels 36 therein (FIG. 10).

III(b) The residual masking material is eliminated.

Figure 11:
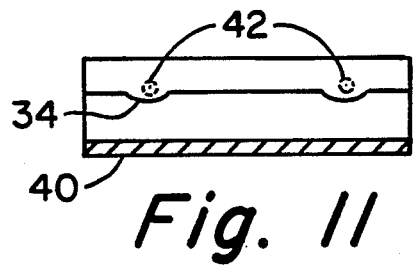

III(c) If desired, initially formed optical channels 36 can be buried as shown in FIG. 11. This is conventionally accomplished by applying an electrically conductive layer 40 on the surface of body 10 opposite the optical channels, contacting surface 12 with a molten salt bath, and applying an electric field across the body.

Figure 12:
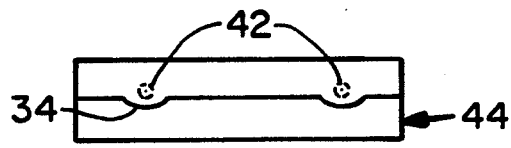
Figure 13:
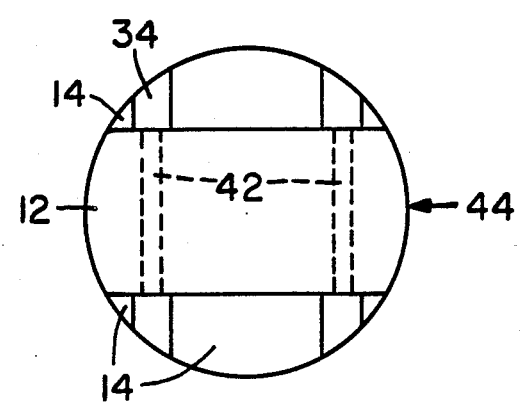
FIG. 13 is a top view of the integrated optical element produced by the method schematically illustrated in FIGS. 3, 4 and 6–12.

III(d) Conductive layer 40 is then removed, the resultant product being schematically illustrated in FIG. 12. A top view of the resultant product, integrated optical element 44, is shown in FIG. 13.

Alternatively, steps II and III can be performed in inverse order.

In the specific example disclosed herein, surfaces 14 are not masked during the process of forming the optical waveguide paths. If the process of forming those paths detrimentally affected surfaces 14, then those surfaces should be masked during that process. In the event that resisting material had been applied over the surfaces 14 in preparation for the process of forming the optical paths, that resisting material is later removed.

The layers 16 and 18 of masking material should be formed from a material capable of resisting the chemical attack from step II(b) and the temperature of the molten salt bath used for the ion exchange process in step III(a) which is ordinarily on the order of 350°–400° C. The material will ordinarily be of an inorganic nature (for example, $Si_3N_4$, titanium), although the possibility of using certain polymer materials that are capable of resisting elevated temperatures, such as silicones, is not excluded. A preferred inorganic material is silicon nitride, $Si_3N_4$. The mask can be deposited by various well known techniques, for example, by vapor phase deposition, sputtering, evaporation, application of a covering composition, etc., according to the nature of the material.

The type of photosensitive resisting material applied in step I(b) and the type of resisting material applied in step II(a), which can be photosensitive or not, are not critical, as long as these resisting materials resist the chemical agents used in steps I(e) and II(b). Many resisting materials, both photosensitive and non-photosensitive, are described in patent literature and are available on the market. The choice of these materials is up to the specialist. The following products are examples of photosensitive resisting materials on the market:

Positive resins:
AZ 145OJ (Shipley Company)
KODAK 820 (KODAK)
HPR 204 (Olin Hunt Corporation)
Negative resins:
KODAK 747 (KODAK)
HNR 120 (Lin Hunt Corporation)

The chemical attack in step II(b) can be executed with the help of a classical engraving (etchant) bath, for example, an aqueous bath containing a mixture of sulfuric acid and hydrofluoric acid.

The elimination of resisting materials can be done with the help of an appropriate aqueous or organic solvent or even with the help of a plasma, according to the nature of the resisting material.

The process of forming optical paths by ion exchange is quite conventional. After the ion exchange, if desired, the formed waveguides can be buried by a supplementary ion exchange process under the influence of an electric field. More details can be found concerning these techniques by referring to the following articles and patents:

J. Goell et al., BELL System Tech. J., Vol. 48 pp. 3445–48 (1969);
H. Osterberg et al., J. of Optical Soc. of America, Vol. 54, pp. 1078–1084 (1964);
U.S. Pats. Nos. 3,880,630 and 4,765,702.

Figure 14:
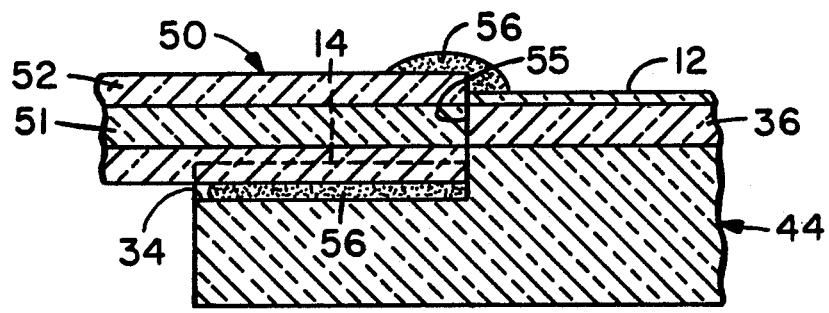
FIG. 14 is a partial cross-sectional view illustrating the connection of an optical fiber to the integrated optical element of FIG. 13.

An optical fiber can be connected to the integrated optical circuit as shown in FIG. 14. Fiber 50 comprising core 51 and cladding 52 is positioned in groove 34 in such a way that its endface is adjacent the vertical lateral surface of the interface shoulder 55, the fiber endface being at or spaced a few microns from shoulder 55. Because of the process by which groove 34 and optical path 36 are formed, the fiber end is aligned with the termination of optical path 36. After an optical fiber is positioned in the groove 34, it can be bonded thereto by an appropriate glue 56 (for example, a glue that hardens under the effect of ultra violet rays).

Of course, the integrated optical component could be something other than the simple connector shown in FIG. 13; the component could be, for example, a coupler-divider, near monomode coupler, a multimode multiplexer coupler, an element allowing for the alignment of an optical fiber with a collimating lens, a multimode monitor, etc. . . according to the nature of the optical channels. Reference is made to U.S. Pat. No. 4,765,702 which illustrates various integrated optical elements.

Figure 15:
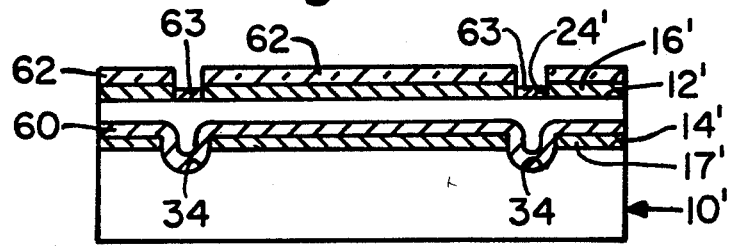
FIGS. 15 and 16 are schematic illustrations of processing steps of an alternative embodiment.
Figure 16:
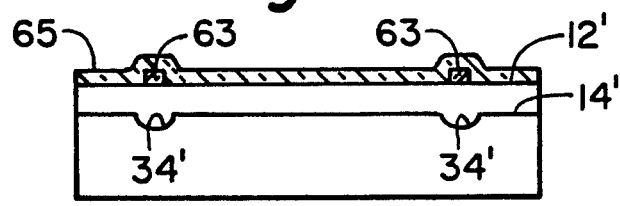

FIGS. 15 and 16 illustrate that techniques other than ion exchange could be employed to form the optical channels of the integrated optical element. In these figures, elements similar to those of FIG. 9 are represented by primed reference numerals. The initial steps of this alternative embodiment are the same as steps I(a) through II(b) which resulted in the formation of the intermediate product shown in FIG. 9. FIG. 15 depicts the intermediate product after layer 32 of resisting material is removed. A layer 60 of resisting material is deposited over layer 17' to prevent the subsequent deposition of material in grooves 34'. A layer 62 of relatively high refractive index material could be deposited on the surface of layer 16' by a conventional technique such as rf sputtering, evaporation, chemical vapor deposition, flame hydrolysis or the like. For example, if body 10' is formed of $SiO_2$, layer 62 could comprise $SiO_2$ doped with an oxide such as $GeO_2$, $TiO_2$ or the like, which provides a glass of greater refractive index than $SiO_2$. Portions 63 of layer 62 deposit on surface 12' in alignment with grooves 34'. Layer 60 of resisting material and layers 16' and 17' are removed, thereby resulting in the integrated optical element shown in FIG. 16. If desired, a layer 65 of cladding glass, having a refractive index lower than that of waveguide paths 63, can be similarly deposited over the paths 63.

The relative level of surface 14, 14' with respect to surface 12, 12' depends upon the location of the optical path with respect to surface 12, 12' and the location of the optical fiber axis with respect to surface 14, 14'. The height of the optical fiber axis above surface 14,14' depends upon the fiber diameter and the width of groove 34 or 34'. In the embodiment of FIG. 12, wherein the optical path is buried under surface 12, surface 14, must be recessed a sufficient distance to locate the optical fiber axis below surface 12. In the embodiment of FIG. 16, wherein optical paths 63 are above surface 12', surfaces 14' need not be recessed to the extent that they are in FIG. 12. Indeed, if the axis of the optical path is located a sufficient distance above surface 12', that surface could be coplanar with surface 14'.

In order to further illustrate the process of the invention, the following non-limiting example is given.

A. Preparation of Glass Body 10

There is provided a clean polished glass disc with a diameter of 60 mm and a thickness of 3 mm. For dehydration purposes, the glass disc is fired at 120° C. for 1 hour. An adherence promoter is then deposited on the disc by placing the disc in contact with gaseous hexamethyldisilane at room temperature for 2 minutes. After that, a layer of a photosensitive resisting composition (AZ 1450 J resin sold by the SHIPLEY Company) is deposited on the treated disc by centrifugation at 3500 t/mn for 45 seconds, in such a way as to obtain a layer with about a 1.9 μm thickness. This layer is fired at 90° C. for 30 minutes to eliminate the solvent. Next, the photosensitive resin found on the upper surface of the disc is exposed through a photomask having an opaque central part and two transparent opposite lateral sectors, corresponding to the flat shoulders to be formed, on an exposure machine SET MAT 750 sold by the SULZER ELECTRO TECHNICAL Company. The exposure radiation has a wavelength of 365 nm to 436 nm and an energy of 156 mJ.

After the exposure, the exposed parts corresponding to the flat parts are eliminated by employing a "Shipley 351 Developer" sold by the SHIPLEY Company at 20% in volume of water (1 part product per 4 parts water). The developing time is 2 minutes at 22° C. Next, a firing is done including a heating at 105° C. for 30 minutes followed by a heating at 200° C. for 1 hour in order to post-harden the resisting material.

Thereafter, the parts of the upper surface stripped by the developing step and corresponding to the flat shoulders to be formed are subjected to etching by an etchant bath made up, in volume, of 99% sulfuric acid at 50% in weight and 1% hydrofluoric acid at 40% in weight. The etching (cutting) time is 125 minutes to obtain a cut depth of 75 μm. An oxygen plasma generated by a plasmafab apparatus 505 from ETA ELECTRO TECH is employed to eliminate the existing resin. Operating conditions are: pressure=200mtorrs, power=500W, time=1 hour. This results in the formation of a glass body 10 (FIG. 1) having a central plane region 12 and two opposite shoulders 14 that are recessed relative central part. As used herein the term "recessed" means that the surfaces are in different planes, the level of the flat surface being at a lower level than the planar surface.

B. Deposition of $Si_3N_4$ Mask Layer

Masking layers of silicon nitride are deposited on the upper surface of glass body 10 by vapor phase deposition under the following conditions:

Equipment: Plasmafab 310 from ETA ELECTROTECH
Gas: $SiH_4$ at 2% in nitrogen
Flow: 2000 sccm (standard cm/min)
Pressure: 750 mtorrs
Power: 60 watts
Temperature: 300° C.
Time: 1 hour This results in the formation of layers 16 and 17 of $Si_3N_4$ (FIG. 2), the thickness of these layers being 1 μm.

C. Photoengraving the Mask

Figure 3:
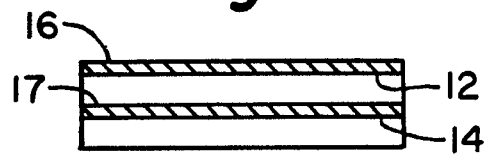
FIGS. 3, 4 and 6–12 are schematic illustrations of the body of FIG. 1 during various processing steps.
Figure 4:
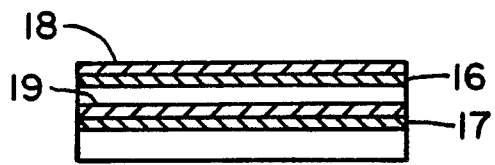

As shown in FIG. 3, layers 18 and 19 of photosensitive resisting material are applied over layers 16 and 17 of masking material, respectively, by following the operating procedure from part A. above, including the firing application of the adherence promoter.

The resulting photosensitive layer is exposed through a photomask 20 (FIG. 5) comprising an opaque element having transparent regions 22 corresponding to the grooves and waveguides. The exposure machine and operating conditions are the same as those described in part A. In the manner described in part A, the exposed parts are eliminated (corresponding to the grooves and waveguides) also as described in part A, including the final firing. Thus, an element is obtained in which the resin material is eliminated to form openings 24 in the in the regions where the waveguides are to be formed and openings 26 in the regions where the alignment grooves are to be formed, the openings 24 and 26 being suitably aligned as shown in FIG. 6.

The exposed regions of layers 16 and 17 of masking material are then etched. This process is performed with the help of a plasma under the following conditions:

Equipment: Plasmafab 505 from ETA ELECTROTECH
Gas: $CF_4 + 4\% O_2$
Pressure: 200 mtorrs
Power: 200 W
Time: 10 minutes This results in the formation of the article represented in FIG. 7 wherein layer 16 of masking material contains openings 28 and layers 17 contain openings 30.

Lastly, an oxygen plasma as described in part A is employed to remove the residual portions of layers 18 and 19 of resisting material, thereby resulting in the article of FIG. 8.

D. Etching the Optical Fiber Positioning Grooves

The central region 12 is covered with a resisting material 32 as described in part A. Then, those portions of shoulders 14 that are exposed through openings 30 are subjected to an etching process similar to that described in part A. The etching time time is 80 minutes in order to obtain a cut depth of about 50 μm. As shown in FIG. 8, the engraving profiles of grooves 34 that are formed by this process are approximately semicircular.

E. Ion Exchange

An oxygen plasma is employed to eliminate the resisting material 32 covering the central region 12 in the manner described in part A. The upper masked surface of region 12 is then subjected to a conventional ion exchange process. Region 12 is treated for 3 hours in a 375° C. bath of molten salts formed of equimolar proportions of $AgNO_3$ and $AgCl$ in such a way as to substitute Ag+ ions for alkaline metal ions present in the glass at those portions of the surface of region 12 that are exposed through openings 28. The index of refraction of the glass is therefore locally modified in such a way as to create optical channels 36 in the superficial part of the glass. Thereafter, the disc is taken out of the salt bath, and the masks are eliminated by a plasma in a manner similar to that which is described in part C.

If desired, optical channels 36 can then be buried. This can be accomplished by covering the side of disc 10 opposite that having the optical channel with a layer 40 of gold. The side of the body having waveguides 36 is delicately placed in contact with a molten salt bath made up of 83 moles % of $KNO_3$ and 17 moles % of $NaNO_3$ at 365° C. for 4 hours, 15 minutes, while an electrical field of 33 V/mm is established between the layer of gold and a platinum electrode placed in the bath, the bath being polarized positively in relation to the layer of gold. This treatment has the effect of burying the waveguides 36, and it leads to the formation of quasi-circular multimode waveguides 42 situated at about 25 μm under the surface of the glass as shown in FIG. 11. Gold layer 12 can be eliminated by subjecting it to attack by an appropriate chemical such as, for example, of aqua regia to form the product illustrated in FIG. 12.

The resultant product, integrated optical element 44, is shown in FIG. 13. In the specific example described, integrated optical element 44 is a double connector which permits the easy connection of two pairs of optical fibers. The fact that openings 24 and 26 (FIG. 6) are formed by a single exposure through one photomask causes these openings and, consequently, mask openings 28 and 30 (FIG. 7), to be precisely aligned. As a result, the alignment grooves 34 that are etched in registration with openings 30 are precisely aligned with optical paths 42, which are formed by chemical treatment through openings 28. Such alignment grooves allow precise alignment between the endface of an optical fiber placed in the groove and the adjacent termination or end surface of the optical circuit path.

It is to be understood that the invention is not limited to the exact details of construction, operation, exact materials, or embodiments shown and described, as modifications and equivalents will be apparent to one skilled in the art without departing from the scope of the invention. Accordingly, the invention is to be limited only by the scope of the appended claims.

I claim:

1. A method for manufacturing an integrated optical component having at least one groove for positioning an optical fiber in alignment with an optical waveguide of said optical component, said method comprising the steps of
providing a glass body having at least one planar surface and at least one flat surface laterally disposed with respect to said planar surface,
depositing a layer of masking material on said planar surface and a layer of masking material on said flat surface,
photolithographically forming in said layer of masking material which overlies said flat surface a first patterned opening having a design corresponding to the groove of said optical component,
photolithographically forming in said layer of masking material which overlies said planar surface, in alignment with said first patterned opening, a second patterned opening having a design corresponding to the waveguide of said optical component,
forming an optical waveguide path through said second patterned opening,
subjecting to a chemical attack that portion of said flat surface that is exposed through said first patterned opening in order to form therein an optical fiber positioning groove that is in precise alignment with said optical path, and
eliminating the residual portions of said masking material.

2. A method in accordance with claim 1 wherein the step of subjecting said flat surface to chemical attack is performed prior to the step of forming an optical waveguide path, said method further comprising the step of applying a layer of chemical resistant material to that portion of said mask overlying said planar surface prior to subjecting said flat surface to chemical attack.

3. A method in accordance with claim 1 wherein the step of forming an optical waveguide path is performed prior to the step of subjecting said flat surface to chemical attack, said method further comprising the step of applying a layer of chemical resistant material to that portion of said mask overlying said planar surface prior to subjecting said flat surface to chemical attack.

4. A method in accordance with claim 1 wherein the step of providing a glass body comprises providing a body wherein said flat surface is recessed with respect to said planar surface such that said surfaces are in different planes.

5. A method in accordance with claim 4 wherein the step of forming an optical waveguide path through said second patterned opening comprises subjecting the zones of said planar surface that are devoid of a masking layer to an ion exchange process to form optical channels therein.

6. A method in accordance with claim 5 further comprising the step subjecting said planar surface to a supplementary treatment whereby said channels formed in said planar surface are buried beneath said planar surface.

7. A method in accordance with claim 1 wherein the step of forming an optical waveguide path through said second patterned opening comprises forming an optical waveguide path on those regions of said planar surface that are devoid of a masking layer.

8. A method in accordance with claim 7 wherein the step of forming an optical waveguide path comprises depositing on said regions of said planar surface that are devoid of a masking layer a layer of glass by a process selected from the group consisting of rf sputtering, evaporation chemical vapor deposition and flame hydrolysis.

9. A method for manufacturing an integrated optical component having at least one groove for positioning an optical fiber in alignment with an optical waveguide of said optical component, said method comprising the steps of
providing a glass body having at least one planar surface and at least one flat surface recessed with respect to said planar surface,
depositing layers of masking material on said planar surface and said flat surface,
applying layers of photosensitive resisting material on said layers of masking material,
exposing said photosensitive layers to an appropriate source of radiation through a photomask having a design corresponding to the grooves and waveguides to be made in said optical component,
developing the exposed photosensitive resisting layers and eliminating parts of the resisting material, thereby forming openings corresponding to said waveguides and grooves to be formed,
eliminating the parts of said masking layers exposed through the openings in said resisting layers,
eliminating the residual resisting material,
applying a layer of chemical resistant material over the mask on said planar surface,
subjecting to a chemical attack that portion of said flat surface that is exposed through the opening in said layer of masking material in order to form therein an optical fiber positioning groove,
eliminating said chemical resistant material,
subjecting the zones of said planar surface that are devoid of masking material to an ion exchange process to form optical channels therein, and
eliminating the residual portions of said masking material.

10. A method in accordance with claim 9 further comprising the step subjecting said planar surface to a supplementary treatment whereby said channels formed in said planar surface are buried beneath said planar surface.

11. A method in accordance with claim 10, characterized in that the masking layer is formed of silicon nitride.

12. A method in accordance with claim 11 further comprising the step of positioning an optical fiber in said groove with the endface thereof adjacent the end of said optical path and securing said optical fiber to said integrated optical component.

13. A method for manufacturing an integrated optical component having at least one groove for positioning an optical fiber in alignment with an optical waveguide of said optical component, said method comprising the steps of
providing a transparent glass substrate having at least one planar surface and at least one flat surface laterally disposed with respect to said planar surface,
depositing a first layer of masking material on said planar surface and a second layer of masking material on said flat surface,
photolithographically forming first and second patterned openings in said first and second layers of masking material, respectively, by a process having a single exposure step, said first patterned opening having a design corresponding to the groove of said optical component, and said second patterned opening having a design corresponding to the waveguide of said optical component, forming an optical waveguide path through said second patterned opening, subjecting to a chemical attack that portion of said flat surface that is exposed through said first patterned opening in order to form therein an optical fiber positioning groove that is in precise alignment with said optical path, and eliminating the residual portions of said masking material.

14. A method in accordance with claim 13 wherein the steps of photolithographically forming said first and second patterned openings in said layers of masking comprise the steps of applying layers of photosensitive resisting material on said layers of masking, exposing said photosensitive layers to an appropriate source of radiation through a single photomask having a design corresponding to the grooves and waveguides of said optical component, developing the exposed photosensitive layers, eliminating the the appropriate parts of the resisting material, thereby forming openings in said resisting material corresponding in location to said waveguides and grooves to be formed, eliminating the parts of the masking layer exposed through said openings, and eliminating the residual resisting material.

15. A method in accordance with claim 13 wherein the step of subjecting said flat surface to chemical attack is performed prior to the step of forming an optical waveguide path, said method further comprising the step of applying a layer of chemical resistant material to that portion of said mask overlying said planar surface prior to subjecting said flat surface to chemical attack.

16. A method in accordance with claim 13 wherein the step of forming an optical waveguide path is performed prior to the step of subjecting said flat surface to chemical attack, said method further comprising the step of applying a layer of chemical resistant material to that portion of said mask overlying said planar surface prior to subjecting said flat surface to chemical attack.

17. A method in accordance with claim 13 wherein the step of providing a glass body comprises providing a body wherein said flat surface is recessed with respect to said planar surface such that said surfaces are in different planes.

18. A method in accordance with claim 17 wherein the step of forming an optical waveguide path through said second patterned opening comprises subjecting the zones of said planar surface that are devoid of a masking layer to an ion exchange process to form optical channels therein.

19. A method in accordance with claim 18 further comprising the step of subjecting said planar surface to a supplementary treatment whereby said channels formed in said planar surface are buried beneath said planar surface.

* * * * *